United States Patent
Hashimoto et al.

(10) Patent No.: US 11,421,622 B2
(45) Date of Patent: Aug. 23, 2022

(54) VEHICLE CONTROLLER, VEHICLE CONTROL SYSTEM, AND LEARNING DEVICE FOR VEHICLE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/115,863

(22) Filed: Dec. 9, 2020

(65) Prior Publication Data
US 2021/0189990 A1    Jun. 24, 2021

(30) Foreign Application Priority Data
Dec. 23, 2019 (JP) .............................. JP2019-231145

(51) Int. Cl.
*F02D 41/24* (2006.01)
*F02D 41/00* (2006.01)
(Continued)

(52) U.S. Cl.
CPC ..... *F02D 41/2438* (2013.01); *F02D 41/0002* (2013.01); *F02D 41/0052* (2013.01);
(Continued)

(58) Field of Classification Search
CPC ............. F02D 41/2438; F02D 41/0002; F02D 41/0052; F02D 41/2487; F02D 41/1454;
(Continued)

(56) References Cited

U.S. PATENT DOCUMENTS 5,386,695 A * 2/1995 Iwata .................... F01N 11/007
60/276
5,636,621 A * 6/1997 Maki .................... F02D 41/1402
123/480

(Continued)

FOREIGN PATENT DOCUMENTS

JP                2016-6327 A       1/2016

*Primary Examiner* — Phutthiwat Wongwian
*Assistant Examiner* — Susan E Scharpf
(74) *Attorney, Agent, or Firm* — Oblon, McClelland, Maier & Neustadt, L.L.P.

(57) ABSTRACT

A vehicle controller includes processing circuitry and a storage device. The storage device stores relationship specifying data that specifies a relationship between a state of a vehicle and at least one action variable. The at least one action variable is a variable related to operation of an operating unit of an internal combustion engine. The processing circuitry is configured to execute an obtaining process that obtains a state of the vehicle, an operating process that operates the operating unit based on a value of the at least one action variable, a reward calculation process, an updating process that updates the relationship specifying data, and a determination process that determines whether the internal combustion engine has deteriorated. The determination process is executed on condition that at least one of the at least one action variable equals a predetermined value.

8 Claims, 10 Drawing Sheets

(51) Int. Cl.
*F02D 41/14* (2006.01)
*F02D 41/22* (2006.01)

(52) U.S. Cl.
CPC ....... *F02D 41/1454* (2013.01); *F02D 41/221* (2013.01); *F02D 41/2467* (2013.01); *F02D 41/2487* (2013.01); *F02D 2041/0017* (2013.01); *F02D 2041/224* (2013.01); *F02D 2200/101* (2013.01)

(58) Field of Classification Search
CPC ............... F02D 41/221; F02D 41/2467; F02D 2200/101; F02D 2041/0017; F02D 2041/224; F02D 2200/0404; F02D 41/2454; F02D 31/002; F02D 41/22
See application file for complete search history.

(56) References Cited

U.S. PATENT DOCUMENTS

| | | | | |
|---|---|---|---|---|
| 5,666,934 | A * | 9/1997 | Maki | F02D 41/008 123/679 |
| 5,678,515 | A * | 10/1997 | Kato | F02D 13/0234 123/90.15 |
| 5,794,604 | A * | 8/1998 | Suzuki | F02D 41/008 123/673 |
| 5,951,617 | A * | 9/1999 | Shinohara | G01M 15/11 701/110 |
| 6,019,085 | A * | 2/2000 | Sato | F02D 11/105 123/339.19 |
| 6,041,279 | A * | 3/2000 | Maki | F02D 41/008 123/480 |
| 2003/0051474 | A1* | 3/2003 | Shirakawa | F02M 26/16 60/602 |
| 2004/0020461 | A1* | 2/2004 | Miyashita | F02D 41/2441 123/399 |
| 2008/0308065 | A1* | 12/2008 | Imai | F02D 41/402 123/299 |
| 2009/0112447 | A1* | 4/2009 | Ishizuka | F02D 41/18 701/109 |
| 2010/0168989 | A1* | 7/2010 | Gao | F02D 41/2429 701/110 |
| 2012/0006307 | A1* | 1/2012 | Demura | F02D 41/2454 123/674 |

* cited by examiner

VEHICLE CONTROLLER, VEHICLE CONTROL SYSTEM, AND LEARNING DEVICE FOR VEHICLE

BACKGROUND

1. Field

The following description relates to a vehicle controller, a vehicle control system, and a learning device for a vehicle.

2. Description of Related Art

Japanese Laid-Open Patent Publication No. 2016-6327 describes an example of a controller that operates a throttle valve, that is, an operating unit of an internal combustion engine mounted on a vehicle, based on a value obtained by processing an operation amount of an accelerator pedal through a filter.

The filter needs to set an appropriate operation amount of the throttle valve of the internal combustion engine mounted on the vehicle in accordance with the operation amount of the accelerator pedal. Therefore, one skilled in the art typically needs to perform a large amount of work for adaptation of the filter. Typically, one skilled in the art performs a large amount of work for adaptation of the operation amount or the like of the operating unit of the internal combustion engine in accordance with the state of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure and their operation and advantages are as follows.

Aspect 1. An aspect of the present disclosure provides a vehicle controller that includes processing circuitry and a storage device. The storage device stores relationship specifying data that specifies a relationship between a state of a vehicle and at least one action variable. The at least one action variable is a variable related to operation of an operating unit of an internal combustion engine mounted on the vehicle. The processing circuitry is configured to execute an obtaining process that obtains a state of the vehicle based on a detection value of a sensor, an operating process that operates the operating unit based on a value of the at least one action variable determined by the state of the vehicle obtained by the obtaining process and the relationship specifying data, a reward calculation process that assigns a reward based on the state of the vehicle obtained by the obtaining process so that the reward assigned when a property of the vehicle meets a criterion is greater than the reward assigned when the property of the vehicle does not meet the criterion, an updating process that updates the relationship specifying data using the state of the vehicle obtained by the obtaining process, the value of the at least one action variable used for operation of the operating unit, and the reward corresponding to the operation as inputs to a predetermined update mapping, and a determination process that determines whether the internal combustion engine has deteriorated. The determination process is executed on condition that at least one of the at least one action variable equals a predetermined value. The update mapping outputs the relationship specifying data that is updated to increase an expected return of the reward when the operating unit is operated in accordance with the relationship specifying data.

This configuration calculates a reward corresponding to operation of the operating unit to acknowledge what type of reward is obtained by the operation. Based on the reward, the relationship specifying data is updated by the update mapping in accordance with reinforcement learning. Thus, the relationship between the state of the vehicle and at least one action variable is appropriately set for traveling of the vehicle. Accordingly, when setting the relationship between the state of the vehicle and the at least one action variable to a relationship appropriate for traveling of the vehicle, the amount of work performed by one skilled in the art is reduced.

When reinforcement learning is performed, how the operating unit is operated depends on a result of the learning. Determination of whether the internal combustion engine has deteriorated may be made based on some states on the assumption that the other states are in predetermined states. In performing such determination, when reinforcement learning is performed or when the operating unit is operated based on the relationship specifying data updated by reinforcement learning, a precondition for the determination may not be satisfied. In this regard, the configuration described above executes the determination process on condition that at least one of the at least one action variable equals the predetermined value. Thus, the execution condition of the determination process is satisfied.

Aspect 2. In the vehicle controller according to aspect 1, the processing circuitry may be configured to stop the operating process, execute an active process that operates the operating unit so that at least one of the at least one action variable equals the predetermined value, and execute the determination process during execution of the active process.

This configuration executes the active process to ensure that at least one of the at least one action variable equals the predetermined value. In this configuration, at least one of the action variable becomes equal to the predetermined value more quickly and assuredly than in a configuration that does not execute the active process.

Aspect 3. In the vehicle controller according to aspect 1 or 2, the processing circuitry may be configured to execute the determination process on condition that the vehicle is at a standstill.

When the vehicle is at a standstill, the internal combustion engine receives a smaller request than when the vehicle is traveling. The configuration described above executes the determination process when the vehicle is at a standstill. The precondition for the determination process is readily satisfied as compared to when the vehicle is traveling.

Aspect 4. In the vehicle controller according to any one of aspects 1 to 3, the internal combustion engine may include, as the operating unit, a throttle valve and an exhaust gas recirculation (EGR) regulator that is configured to regulate an EGR amount. The operating process may include a process that operates the throttle valve and the EGR regulator so that a rotation speed of a crankshaft of the internal combustion engine is controlled to a target rotation speed. The at least one action variable may include a variable related to an opening degree of the throttle valve and an EGR variable, which is a variable used to operate the EGR regulator. The determination process may include a process that determines whether an intake system of the internal combustion engine has deteriorated based on the opening degree of the throttle valve on condition that the EGR regulator is in a predetermined state.

For example, objects may be deposited in the intake passage and decrease the cross-sectional area of the flow passage of the intake passage. When the cross-sectional area of the flow passage is decreased, the opening degree of the throttle valve, which is an operation amount to control the rotation speed of the crankshaft of the internal combustion engine to the target rotation speed, is greater than when the cross-sectional area of the flow passage is not decreased. Such an abnormality of the intake system could be determined based on the opening degree of the throttle valve if the EGR regulator is in a fixed state.

The configuration described above may operate the EGR regulator in addition to the throttle valve to control the rotation speed to the target rotation speed. The control is executed further appropriately from the viewpoint of reducing the fuel consumption amount. Since this configuration requires a large number of man-hours for the adaptation, reinforcement learning is used to explore for an appropriate value of an action variable. However, an appropriate opening degree of the throttle valve for controlling the rotation speed to the target rotation speed differs between different states of the EGR regulator even when the intake air amount is the same. This adversely affects the determination of whether the intake system has deteriorated that is made based on the opening degree of the throttle valve when controlling the rotation speed to the target rotation speed. In this regard, the configuration described above executes the determination process on condition that the EGR regulator is in the predetermined state, so that the determination of whether the deterioration has occurred is made based on the opening degree of the throttle valve.

Aspect 5. In the vehicle controller according to any one of aspects 1 to 4, the internal combustion engine may include a fuel injection valve as the operating unit. The at least one action variable may include an air-fuel ratio variable, which is a variable that determines an air-fuel ratio of a mixture in a combustion chamber of the internal combustion engine. The determination process may include a process that determines whether the fuel injection valve has deteriorated based on an open time of the fuel injection valve on condition that the air-fuel ratio variable equals a predetermined value.

Deterioration of the fuel injection valve tends to extend time for which the valve is open to inject a predetermined fuel. Hence, whether the deterioration has occurred may be determined based on the open time of the fuel injection valve, for example, when the target air-fuel ratio is constant.

However, the air-fuel ratio of the mixture in the internal combustion engine that is set each time to, for example, optimize control of the exhaust property at the downstream side of the catalyst arranged in the exhaust passage may be indefinite. In this regard, in the configuration described above, the air-fuel ratio variable is subject to reinforcement learning to explore for an optimal value. However, in this case, it is difficult to determine whether an abnormality has occurred based on the open time of the fuel injection valve. Therefore, the configuration described above executes the determination process on condition that the air-fuel ratio variable equals the predetermined value, so that whether the deterioration has occurred in the fuel injection valve is determined based on the valve open time.

Aspect 6. An aspect of the present disclosure provides a vehicle control system. The vehicle control system includes the processing circuitry and the storage device according to any one of aspects 1 to 5. The processing circuitry includes a first execution device mounted on the vehicle and a second execution device that is different from an on-board device. The first execution device is configured to execute at least the obtaining process and the operating process. The second execution device is configured to execute at least the updating process.

In this configuration, the updating process is executed by the second execution device. This reduces calculation loads on the first execution device as compared to a configuration in which the first execution device executes the updating process.

The phrase "the second execution device being a device different from an on-board device" means that the second execution device is not an on-board device.

Aspect 7. An aspect of the present disclosure provides a vehicle controller that includes the first execution device according to aspect 6.

Aspect 8 An aspect of the present disclosure provides a learning device for a vehicle. The learning device includes the second execution device according to aspect 6.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Figure 1:
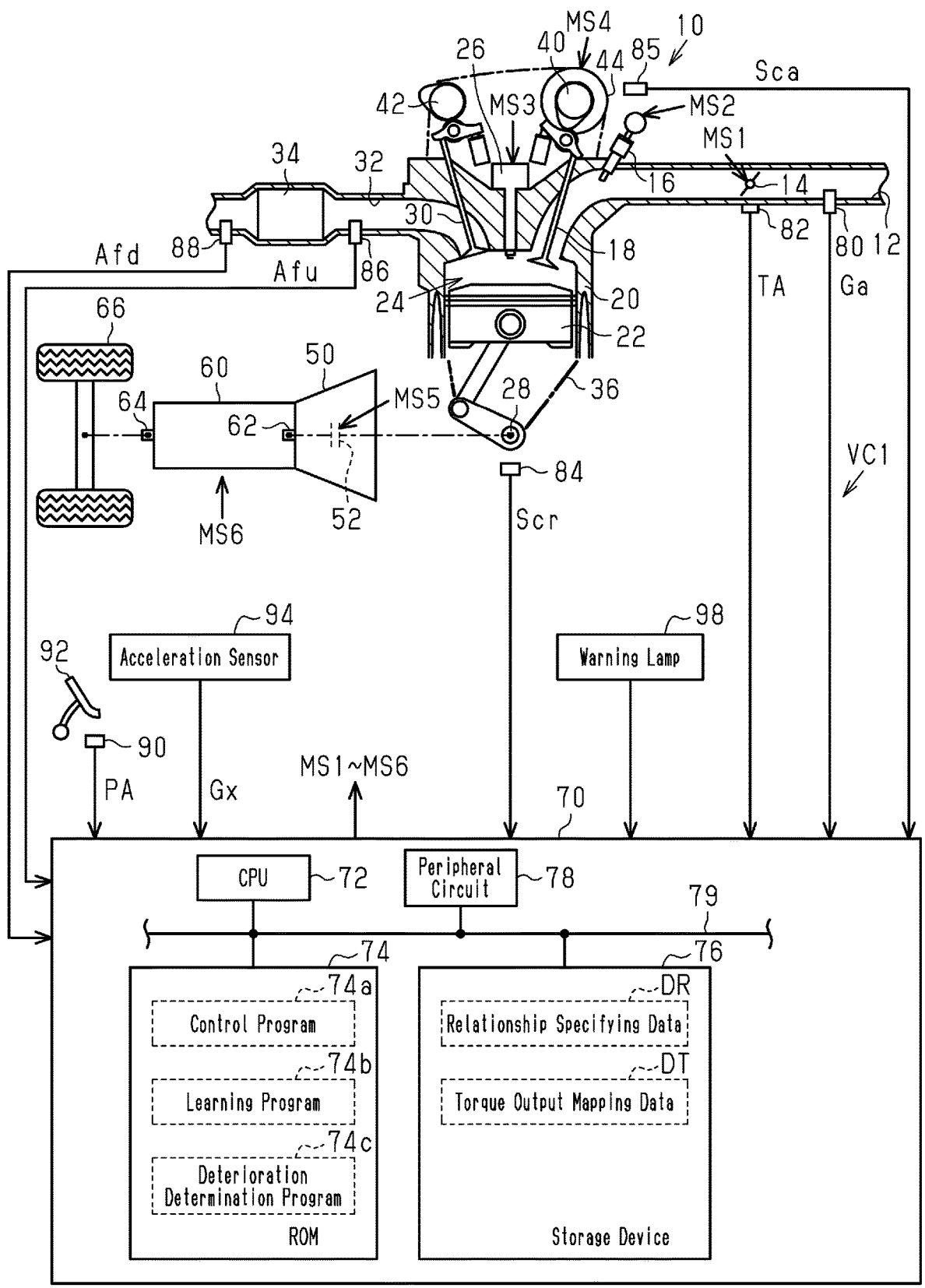
FIG. 1 is a diagram showing the configurations of a first embodiment of a controller and a drive system of a vehicle.

FIG. 1 is a diagram showing the configurations of a drive system and a controller of a vehicle VC1 in the present embodiment.

As shown in FIG. 1, an internal combustion engine 10 includes an intake passage 12 provided with a throttle valve 14 and a fuel injection valve 16, which are sequentially arranged from the upstream side. When an intake valve 18 is open, air drawn into the intake passage 12 and fuel injected from the fuel injection valve 16 flow into a combustion chamber 24 defined by a cylinder 20 and a piston 22. In the combustion chamber 24, a mixture of the air and the fuel is burned by spark discharge of an ignition device 26, and energy generated by the combustion is converted into rotational energy of a crankshaft 28 via the piston 22. The burned air-fuel mixture is discharged to an exhaust passage 32 as exhaust when an exhaust valve 30 is open. The exhaust passage 32 is provided with a catalyst 34 used as a post-processing device that purifies the exhaust.

Rotational power of the crankshaft 28 is transmitted through a timing chain 36 to an intake camshaft 40 and an exhaust camshaft 42. More specifically, the rotational power of the crankshaft 28 is transmitted to the intake camshaft 40 through an intake valve timing variable device 44.

The crankshaft 28 is configured to be mechanically coupled to an input shaft 62 of a transmission 60 by a torque converter 50 including a lock-up clutch 52. The transmission 60 is a device that changes the transmission ratio, that is, the ratio of rotation speed of the input shaft 62 to rotation speed of an output shaft 64. The output shaft 64 is mechanically coupled to drive wheels 66.

The internal combustion engine 10 is controlled by a controller 70, which operates operating units of the internal combustion engine 10 such as the throttle valve 14, the fuel injection valve 16, the ignition device 26, and the intake valve timing variable device 44 to control torque, an exhaust component ratio, and other control aspects. The controller 70 also controls the torque converter 50 and operates the lock-up clutch 52 to control the engagement state of the lock-up clutch 52. The controller 70 also controls the transmission 60 and operates the transmission 60 to control the transmission ratio, which is the control aspect. FIG. 1 shows operating signals MS1 to MS6 of the throttle valve 14, the fuel injection valve 16, the ignition device 26, the intake valve timing variable device 44, the lock-up clutch 52, and the transmission 60, respectively.

To control the control aspects, the controller 70 refers to an intake air amount Ga that is detected by an airflow meter 80, an opening degree of the throttle valve 14 (throttle opening degree TA) that is detected by a throttle sensor 82, an output signal Scr of a crank angle sensor 84, and an output signal Sca of a cam angle sensor 85. The controller 70 also refers to an upstream detection valve Afu, which is a detection value of an upstream air-fuel ratio sensor 86 disposed at the upstream side of the catalyst 34, and a downstream detection value Afd, which is a detection valve of a downstream air-fuel ratio sensor 88 disposed at the downstream side of the catalyst 34. In addition, a central processing unit (CPU) 72 refers to a depression amount of an accelerator pedal 92 (accelerator operation amount PA) that is detected by an accelerator sensor 90 and an acceleration rate Gx in the front-rear direction of the vehicle VC1 detected by an acceleration sensor 94.

The controller 70 includes the CPU 72, a read only memory (ROM) 74, an electrically rewritable nonvolatile memory (storage device 76), and a peripheral circuit 78, which are configured to communicate with each other through a local network 79. The peripheral circuit 78 includes a circuit that generates a clock signal regulating an internal operation, a power supply circuit, a reset circuit, and the like.

The ROM 74 stores a control program 74a, a learning program 74b, and a deterioration determination program 74c. The storage device 76 stores relationship specifying data DR that specifies the relationship of a rotation speed NE and a target rotation speed NE* with an instruction value of the throttle opening degree TA (throttle opening degree instruction value TA*) and an instruction value of an intake phase difference DIN (intake phase difference instruction value DIN*). The intake phase difference DIN is a difference of the rotation angle of the intake camshaft 40 from the rotation angle of the crankshaft 28. The storage device 76 also stores torque output mapping data DT. The torque output mapping data DT specifies a torque output map that uses the rotation speed NE of the crankshaft 28, charging efficiency $\eta$, and ignition timing as inputs to output torque Trq.

Figure 2:
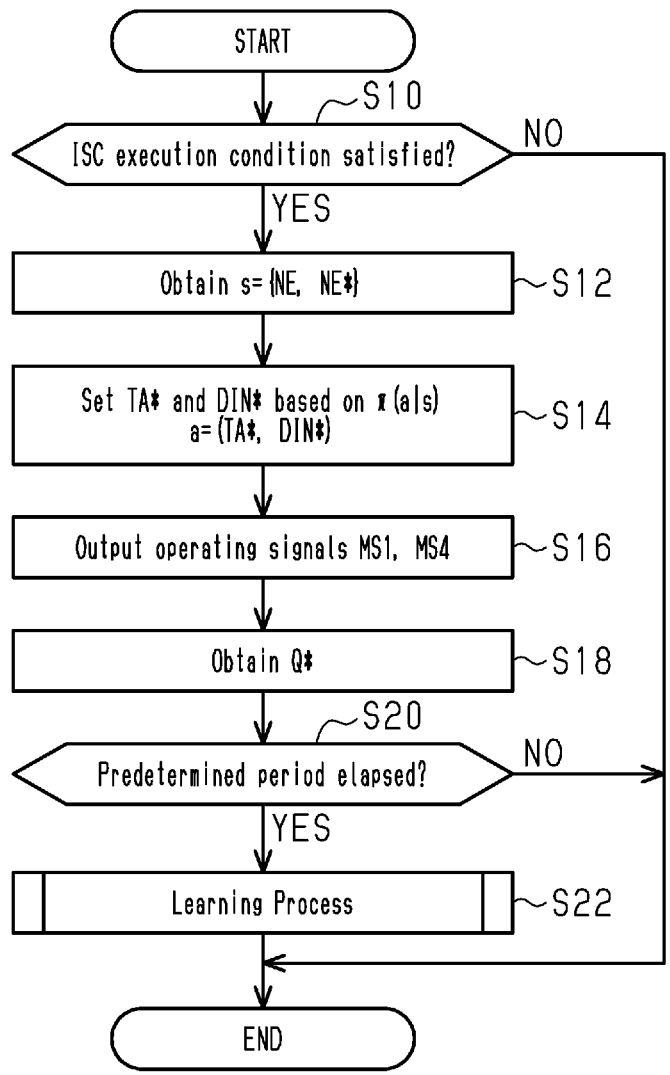
FIG. 2 is a flowchart showing the procedures of a process related to idling rotation speed control in the third embodiment.

FIG. 2 shows the procedures of a process executed by the controller 70 in the present embodiment. The process shown in FIG. 2 is implemented by the CPU 72, for example, repeatedly executing the control program 74a and the learning program 74b stored in the ROM 74 in a predetermined cycle. In the following description, the step number of each process is represented by a numeral provided with an "S" prefix.

In a series of the processes shown in FIG. 2, the CPU 72 first determines whether a condition for executing idling rotation speed control is satisfied (S10). The execution condition may be that, for example, the logical conjunction of the accelerator operation amount PA being zero and the rotation speed NE being less than or equal to a predetermined value is true. The rotation speed NE is calculated by the CPU 72 based on the output signal Scr of the crank angle sensor 84.

If it is determined that the execution condition is satisfied (S10: YES), the CPU 72 obtains the rotation speed NE and the target rotation speed NE* as a state s (S12). For example, when a relatively large shaft torque is requested to the internal combustion engine 10, the CPU 72 may calculate the target rotation speed NE* to be a greater value than when a relatively small shaft torque is requested.

Then, the CPU 72 sets an action a including the throttle opening degree instruction value TA* and the intake phase difference instruction value DIN* corresponding to the state s obtained in S12 in accordance with a policy m determined by the relationship specifying data DR (S14).

In the present embodiment, the relationship specifying data DR determines an action value function Q and the policy $\pi$. In the present embodiment, the action value function Q is a table-type function indicating values of expected return corresponding to a quartic independent variable of the state s and the action a. When the state s is given, while giving priority to selecting the maximum action a (greedy action) in the action value function Q in the state s provided with the independent variable, the policy $\pi$ sets a rule of selecting another action a at a predetermined probability.

The CPU 72 transmits the operating signal MS1 to the throttle valve 14 to operate the throttle opening degree TA based on the throttle opening degree instruction value TA* and the intake phase difference instruction value DIN* that has been set, and transmits the operating signal MS4 to the intake valve timing variable device 44 to feedback-control the intake phase difference DIN (S16). The intake phase difference DIN is a variable used to adjust an internal exhaust gas recirculation (EGR) amount and is calculated by the CPU 72 based on the output signal Scr of the crank angle sensor 84 and the output signal Sca of the cam angle sensor 85.

The CPU 72 obtains an injection amount instruction value Q* (S18). The injection amount instruction value Q* is calculated by the CPU 72 as a fuel amount needed, for example, to control the upstream detection value Afu to a target value.

The CPU 72 determines whether a predetermined period has elapsed from the later one of the point in time when a negative determination was switched to an affirmative determination in S10 and the point in time when S22 (described later) is executed (S20). If it is determined that the predetermined period has elapsed (S20: YES), the CPU 72 updates the relationship specifying data DR (S22).

Figure 3:
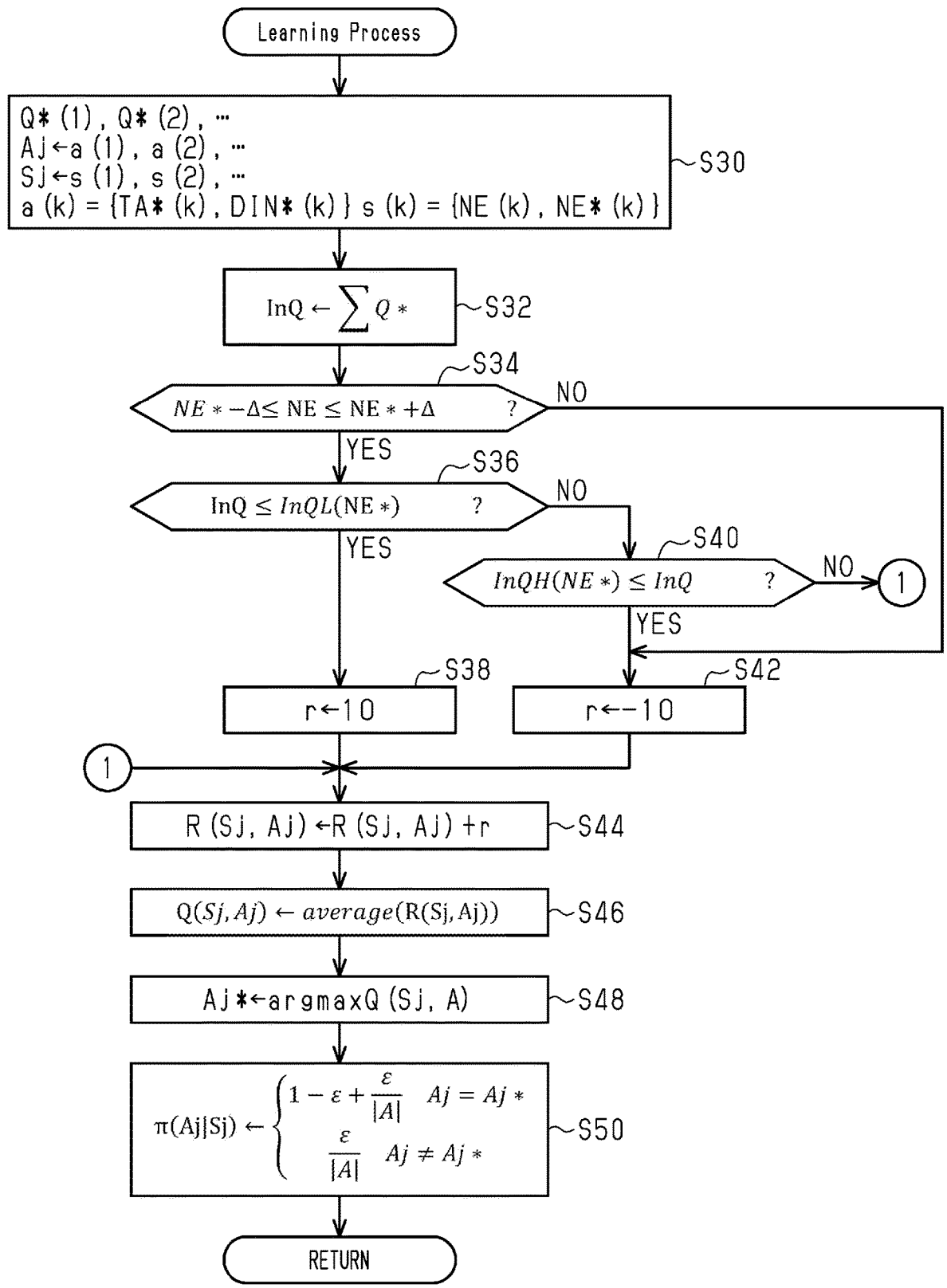
FIG. 3 is a flowchart showing the detailed procedures of a learning process in the first embodiment.

FIG. 3 shows details of the process of S22.

In a series of the processes shown in FIG. 3, the CPU 72 first obtains time series data of the injection amount instruction value Q* and time series data of the state s and the action a in a predetermined period (S30). In FIG. 3, elements having different numerals in parentheses indicate values of a variable sampled at different times. For example, the injection amount instruction value Q*(1) and the injection amount instruction value Q*(2) are sampled at different points in time. Time series data of the action a in a predetermined period is defined as an action set Aj. Time series data of the state s in the predetermined period is defined as a state set Sj. The CPU 72 calculates an accumulated value InQ of the time series data of the injection amount instruction value Q* (S32).

The CPU 72 determines whether condition (A) is satisfied (S34). Condition (A) indicates that an absolute value of a difference between the rotation speed NE and the target rotation speed NE* in the predetermined period is less than or equal to a predetermined value A. If it is determined that condition (A) is satisfied (S34: YES), the CPU 72 determines whether condition (B) is satisfied (S36). Condition (B) indicates that the accumulated value InQ is less than or equal to a highly efficient threshold value InQL. The CPU 72 variably sets the highly efficient threshold value InQL in accordance with the target rotation speed NE*. More specifically, when the target rotation speed NE* is relatively high, the CPU 72 sets the highly efficient threshold value InQL to a greater value than when the target rotation speed NE* is relatively low. If it is determined that condition (B) is satisfied (S36: YES), the CPU 72 assigns "10" to a reward r (S38).

If it is determined that the accumulated value InQ is greater than the highly efficient threshold value InQL (S36: NO), the CPU 72 determines whether condition (C) is satisfied (S40). Condition (C) indicates that the accumulated value InQ is greater than or equal to a low efficient threshold value InQH. The CPU 72 variably sets the low efficient threshold value InQH in accordance with the target rotation speed NE*. More specifically, when the target rotation speed NE* is relatively high, the CPU 72 sets the low efficient threshold value InQH to a greater value than when the target rotation speed NE* is relatively low. When it is determined that condition (C) is satisfied (S40: YES) or a negative determination is made in S34, the CPU 72 assigns "−10" to the reward r (S42).

The processes of S36 to S42 assign a greater reward when the energy usage efficiency is relatively high than when relatively low.

When the process of S38 or S42 is completed or a negative determination is made in S40, the CPU 72 updates the relationship specifying data DR stored in the storage device 76 shown in FIG. 1. In the present embodiment, an ε-soft on-policy Monte Carlo method is used.

More specifically, the CPU 72 adds the reward r to each return R(Sj, Aj) determined by a combination of each state and the corresponding action retrieved in S30 (S44). "R(Sj, Aj)" collectively refers to a return R when one of the elements in the state set Sj is used as the state and one of the elements in the action set Aj is used as the action. The returns R(Sj, Aj) determined by combinations of each state and the corresponding action retrieved in S30 are averaged, and the average is assigned to the corresponding action value function Q(Sj, Aj) (S46). The averaging may be a process that divides the return R calculated in S44 by a value obtained by adding a predetermined number to the number of times S44 was executed. The initial value of the return R may be the initial value of the corresponding action value function Q.

For each state retrieved in S30, the CPU 72 assigns an action including a combination of the throttle opening degree instruction value TA* and the intake phase difference instruction value DIN*corresponding to the maximum value in the corresponding action value function Q(Sj, A) to an action Aj* (S48). In this description, "A" indicates any possible action. Although the action Aj* has different values in accordance with the type of state retrieved in S30, the presentation is simplified and denoted by the same symbol.

For each state retrieved in S30, the CPU 72 updates the corresponding policy π(Aj|Sj) (S50). More specifically, when the total number of actions is denoted by "|A|," the selection probability of the action Aj* selected by S44 is expressed as "(1−ε)+ε/|A|." The selection probability of each action other than the action Aj* is expressed as "ε/|A|." The number of actions other than the action Aj* is "|A|−1." The process of S50 is based on the action value function Q that is updated in S46. Thus, the relationship specifying data DR, which specifies the relationship between the state s and the action a, is updated to increase the return R.

When the process of S50 is completed, the CPU 72 temporarily ends the series of the processes shown in FIG. 3.

Referring again to FIG. 2, when the process of S22 is completed or a negative determination is made in S10 or S20, the CPU 72 temporarily ends the series of the processes shown in FIG. 2. The processes of S10 to S20 are implemented by the CPU 72 executing the control program 74a. The process of S22 is implemented by the CPU 72 executing the learning program 74b. At the shipment of the vehicle VC1, the relationship specifying data DR includes data that has been learned by executing the same process shown in FIG. 2 at a test bench.

Figure 4:
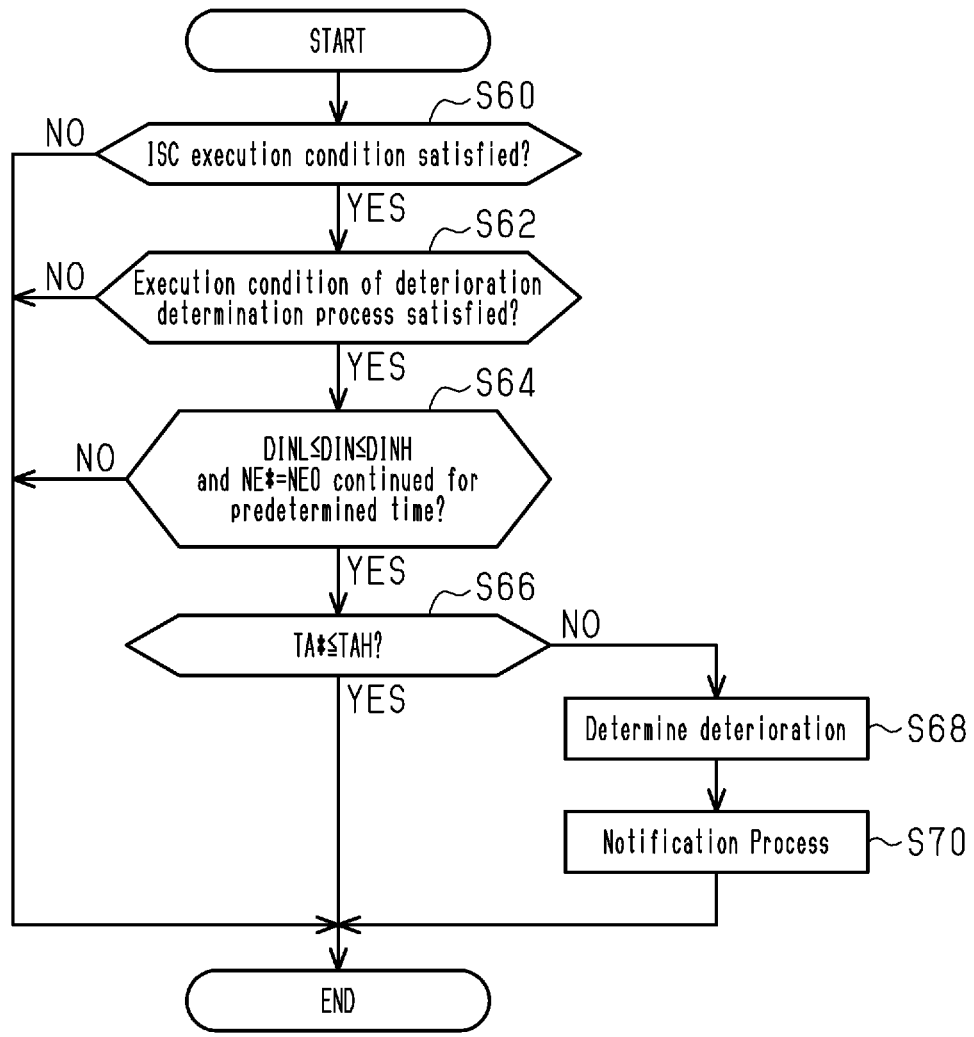
FIG. 4 is a flowchart showing the procedures of a deterioration determination process in the first embodiment.

FIG. 4 shows the procedures of a process executed by the controller 70 related to determination of whether the intake system has deteriorated. The process shown in FIG. 4 is implemented by the CPU 72, for example, repeatedly executing the deterioration determination program 74c stored in the ROM 74 in a predetermined cycle.

In a series of the processes shown in FIG. 4, the CPU 72 first determines whether a condition for executing idling rotation speed control is satisfied (S60). If it is determined that the execution condition is satisfied (S60:YES), the CPU 72 determines whether a condition for executing a deterioration determination process is satisfied (S62). The execution condition of the deterioration determination process may be that, for example, the deterioration determination has not been completed since one of the following conditions is satisfied. The conditions include the accumulated running time of the internal combustion engine 10 being equal to an integral multiple of a predetermined time and the travel distance of the vehicle VC1 being equal to an integral multiple of a predetermined distance. It is desirable that the predetermined distance is, for example, greater than or equal to 5,000 kilometers. It is more desirable that the predetermined distance is greater than or equal to 10,000 kilometers.

The CPU 72 determines whether a state in which the intake phase difference DIN is greater than or equal to a lower limit value DINL and less than or equal to an upper limit value DINH and the target rotation speed NE* is equal to a reference speed NE0 has continued for a predetermined time (S64). If it is determined that the state has continued for the predetermined time (S64:YES), the CPU 72 determines whether the throttle opening degree instruction value TA* is less than or equal to an upper limit opening degree TAH (S66). This process determines whether the intake system has an abnormality. More specifically, for example, when objects are deposited on the throttle valve 14 or the intake passage 12 and deterioration occurs in the intake system due to the deposit, the cross-sectional area of the flow passage in the intake passage 12 is decreased, and the intake air amount Ga is decreased for the throttle opening degree TA. As a result, the throttle opening degree instruction value TA*, which is used to feedback-control the rotation speed NE to the target rotation speed NE*, is increased as compared to that before the deterioration of the intake system. Therefore, the upper limit opening degree TAH is used to determine whether the deterioration has occurred.

If it is determined that the throttle opening degree instruction value TA* is greater than the upper limit opening degree TAH (S66:NO), the CPU 72 determines that the intake system has deteriorated (S68) and operates a warning lamp 98 shown in FIG. 1 to notify the user that the deterioration has occurred (S70).

When S70 is completed, when an affirmative determination is made in S66, or when a negative determination is made in S60, S62, or S64, the CPU 72 temporarily ends the series of the processes shown in FIG. 4.

The operation and advantages of the present embodiment will now be described.

Under the idling rotation speed control, the CPU 72 controls the rotation speed NE to the target rotation speed NE* using the intake phase difference DIN as an operation amount in addition to the throttle opening degree TA. With this configuration, the control reduces the fuel consumption amount as compared to a configuration that executes the idling rotation speed control at a fixed intake phase difference instruction value DIN*. However, addition of the intake phase difference instruction value DIN* to the operation amount increases the number of man-hours for the adaptation. In this regard, in the present embodiment, the idling rotation speed control is executed using the relationship specifying data DR that is learned through reinforcement learning.

In addition, the CPU 72 sets the action a including the throttle opening degree instruction value TA* and the intake phase difference instruction value DIN* in accordance with the policy π. Basically, the CPU 72 selects the action a that maximizes the expected return based on the action value function Q specified in the relationship specifying data DR. In addition, the CPU 72 selects an action other than the action a maximizing the expected return at a predetermined probability "ε−ε|A|" to explore the action a maximizing the expected return. Thus, the relationship specifying data DR is updated by reinforcement learning to appropriate data that reflects individual differences and aging deterioration of the internal combustion engine 10.

However, as described above, when the intake phase difference DIN is used as the operation amount of the idling rotation speed control in addition to the throttle opening degree TA, the deterioration of the intake system may not be accurately determined as compared to when only the throttle opening degree TA is used as the operation amount. That is, in the configuration that uses only the throttle opening degree TA as the operation amount of the idling rotation speed control, the throttle opening degree TA becomes greater when the intake system has deteriorated than when the intake system has not deteriorated. However, the throttle opening degree TA is dependent on the intake phase difference DIN if the intake phase difference DIN is variable.

In this regard, in the present embodiment, on condition that the target rotation speed NE* is equal to the reference speed NE0 and the value of the intake phase difference DIN is in the range between the lower limit value DINL and the upper limit value DINH, whether the intake system has deteriorated is determined based on the throttle opening degree instruction value TA*. The condition that the value of the intake phase difference DIN, which is an action variable of reinforcement learning, is in the predetermined range is provided, so that whether the deterioration has occurred is determined under the same condition.

Second Embodiment

A second embodiment will now be described with reference to the drawings. The differences from the first embodiment will mainly be discussed.

Figure 5:
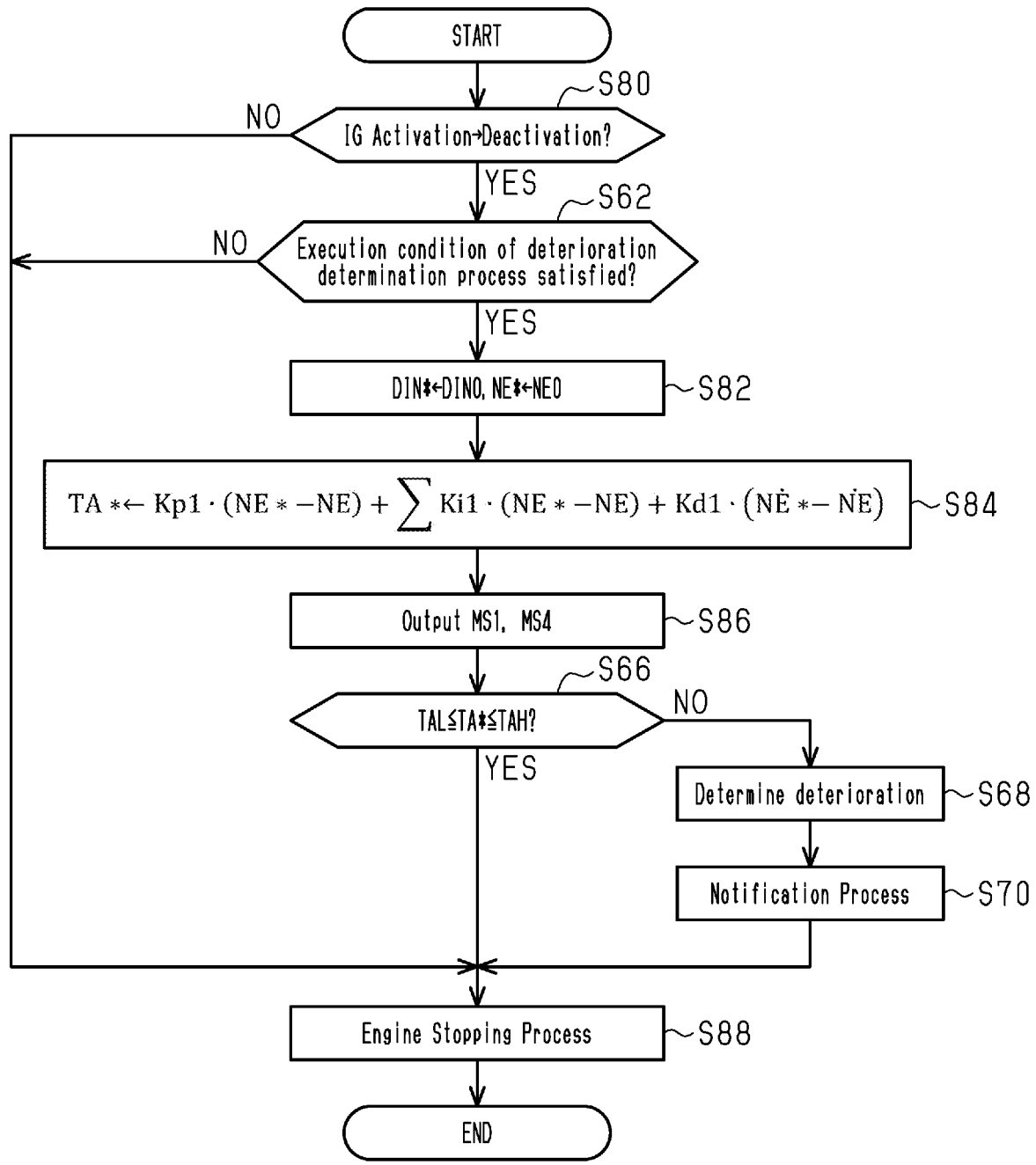
FIG. 5 is a flowchart showing the procedures of a deterioration determination process in a second embodiment.

FIG. 5 shows the procedures of a process related to determination of whether the intake system has deteriorated in the present embodiment. The process shown in FIG. 5 is implemented by the CPU 72, for example, repeatedly executing the deterioration determination program 74c stored in the ROM 74 in a predetermined cycle. For the sake of convenience, in FIG. 5, the same step numbers are given to the processes corresponding to those in FIG. 4.

In a series of the processes shown in FIG. 5, the CPU 72 first determines whether an IG signal, which is a signal corresponding to operation of an ignition switch, is switched from an activation state to a deactivation state (S80). If it is determined that the IG signal is switched (S80:YES), the CPU 72 executes the process of S62. If an affirmative determination is made in S62, the CPU 72 assigns a reference phase difference DIN0 to the intake phase difference instruction value DIN* and assigns the reference speed NE0 to the target rotation speed NE* (S82).

The CPU 72 calculates the throttle opening degree instruction value TA* as an operation amount used to feedback-control the rotation speed NE to the target rotation speed NE* (S84). More specifically, in the present embodiment, when the execution condition of the deterioration determination process is satisfied, the idling rotation speed control is executed so that the rotation speed NE is feedback-controlled to the target rotation speed NE* without using the relationship specifying data DR. In the present embodiment, the throttle opening degree instruction value TA* is set to a sum of an output value of a proportional element that multiplies the difference between the rotation speed NE and the target rotation speed NE* by proportional gain Kp1, an output value of an integral element that adds values obtained by multiplying the difference by integral gain Ki1, and an output value of a derivative element that multiplies a time derivative value of the difference by derivative gain Kd1.

The CPU 72 transmits the operating signal MS1 to the throttle valve 14 so that the throttle opening degree TA is feedback-controlled to throttle opening degree instruction value TA*, and transmits the operating signal MS4 to the intake valve timing variable device 44 so that the intake phase difference DIN is feedback-controlled to the intake phase difference instruction value DIN* (S86). Then, the CPU 72 executes the processes of S66 to S70.

When the process of S70 is completed, when an affirmative determination is made in S66, or when a negative determination is made in S80 or S62, the CPU 72 stops the internal combustion engine 10 (S88) and temporarily ends the series of the processes shown in FIG. 5.

As described above, in the present embodiment, when the IG signal is switched to deactivation, the internal combustion engine 10 is not stopped immediately. Instead, when the IG signal is switched to deactivation, the deterioration determination process is executed. Upon completion of the deterioration determination process, the internal combustion engine 10 is stopped. When the deterioration determination process is executed, the intake phase difference DIN and the target rotation speed NE* are fixed and the idling rotation speed control is executed regardless of the relationship specifying data DR. As a result, the precondition for determining whether the deterioration has occurred is satisfied with high accuracy, which ultimately increases the accuracy of determining whether the deterioration has occurred.

The present embodiment described above further obtains the following operation and advantages.

(1) When the IG signal is in the deactivation state, whether the deterioration has occurred is determined. When the IG signal is in the deactivation state, the request to the internal combustion engine 10 is smaller than when the IG signal is in the activation state, so that active control, in which the intake phase difference DIN and the target rotation speed NE* are fixed, is readily executed.

Third Embodiment

A third embodiment will now be described with reference to the drawings. The differences from the first embodiment will mainly be discussed.

In the present embodiment, a policy gradient method is used as reinforcement learning.

In the present embodiment, reinforcement learning is executed so that the throttle opening degree instruction value TA*, an ignition timing retardation amount aop, a base injection amount Qbse, and a target value Afu* of the upstream detection valve Afu are used as general action variables that are not limited to the idling rotation speed control. The retardation amount aop is an amount of retardation from a predetermined reference ignition timing. The reference ignition timing is the more retarded one of the minimum advance for the best torque (MBT) ignition timing and the knock limit point. The MBT ignition timing is the ignition timing at which the maximum torque is obtained (maximum torque ignition timing). The knock limit point is the advance limit value of the ignition timing at which knocking is restrained within an allowable level under the assumed best condition using a fuel with a high octane number, which has a high knock limit. The base injection amount Qbse is an open-loop operation amount used to control the upstream detection valve Afu to the target value Afu*.

Figure 6:
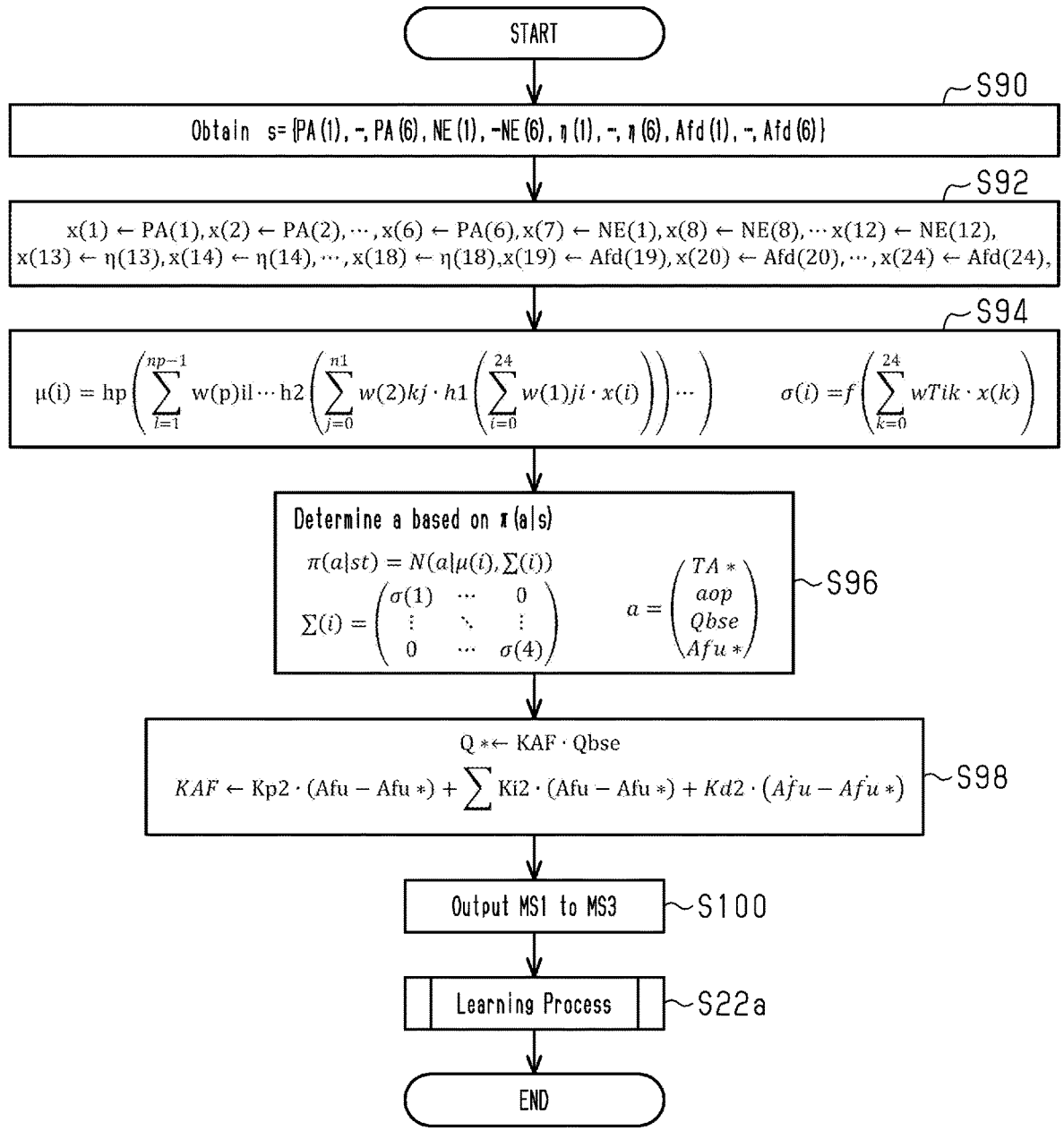
FIG. 6 is a flowchart showing the procedures of a process executed by a controller in a third embodiment.

FIG. 6 shows the procedures of a process executed by the controller 70 in the present embodiment. The process shown in FIG. 6 is implemented by the CPU 72, for example, repeatedly executing the control program 74a and the learning program 74b stored in the ROM 74 in a predetermined cycle.

In a series of the processes shown in FIG. 6, the CPU 72 first obtains time series data of the accelerator operation amount PA, the rotation speed NE, the charging efficiency η, and the downstream detection value Afd as the state s (S90). In the present embodiment, the time series data of each of the accelerator operation amount PA, the rotation speed NE, the charging efficiency η, and the downstream detection value Afd has six values that are sampled at equal intervals.

The CPU 72 assigns the state s to input variables of a function approximator that determines the policy π (S92). More specifically, the CPU 72 assigns the accelerator operation amount PA(i) to an input variable x(i), assigns the rotation speed NE(i) to an input variable x(6+i), assigns the charging efficiency η(i) to an input variable x(12+i), and assigns the downstream detection value Afd to an input variable x(18+i), where i=1 to 6.

The CPU 72 assigns input variables x(1) to x(24) to the function approximator that determines the policy (S94). In the present embodiment, the policy π is a multivariate Gaussian distribution that determines the probability of each operation amount determining the action. In the multivariate Gaussian distribution, an average value μ(1) indicates an average value of the throttle opening degree instruction value TA*, an average value μ(2) indicates an average value of the retardation amount aop, an average value μ(3) indicates an average value of the base injection amount Qbse, and an average value μ(4) indicates an average value of the target value Afu*. In the present embodiment, a covariance matrix of the multivariate Gaussian distribution is a diagonal matrix, variances σ(i) corresponding to each average value μ(i) may have different values.

In the present embodiment, the average values μ(i) are configured by a neural network including "p−1" intermediate layers. In the neural network, activation functions h1 to hp−1 of the intermediate layers are hyperbolic tangents, and an activation function hp of an output layer is a rectified linear unit (ReLU). The ReLU is a function that outputs a non-lesser one of the input and zero. When m=2, 3, . . . , p, the value of each node in the (m−1)th intermediate layer is generated by inputting an output of a linear mapping specified by a coefficient w(m) to the activation function hm. Here, n1, n2, . . . , np−1 are the number of nodes in the first, second, . . . , and (p−1)th intermediate layers, respectively. For example, the value of each node in the first intermediate layer is generated by inputting the input variables x(1) to x(24) to a linear mapping specified by coefficient w(1)ji (j=0 to n1, i=0 to 18) to obtain an output and inputting the output to the activation function h1. In this case, w(1)j0 is one of the bias parameters, and an input variable x(0) is defined as one.

In the neural network described above, each of the four outputs of the activation function hp is the average value μ(i).

In the present embodiment, the variance σ(i) is a value of function f that is obtained by linearly converting the input variables x(1) to x(24) through a linear mapping specified by coefficient wTik (i=1 to 4, k=1 to 24) and inputting each linearly converted value to function f. In the present embodiment, ReLU is used as function f.

The CPU 72 determines the action a based on the policy π specified by the average value μ(i) and the variance σ(i) calculated in S94 (S96). In this case, the probability of selecting the average value μ(i) is the highest. In addition, when the variance σ(i) is relatively small, the probability of selecting the average value μ(i) is higher than when the variance σ(i) is relatively large.

The CPU 72 calculates the injection amount instruction value Q* by correcting the base injection amount Qbse using a feedback correction coefficient KAF, which is an operation amount used to feedback-control the upstream detection valve Afu to the target value Afu* (S98).

The CPU 72 transmits the operating signal MS1 to the throttle valve 14 to operate the throttle opening degree TA, the operating signal MS2 to the fuel injection valve 16 to operate a fuel injection amount, and the operating signal MS3 to the ignition device 26 to operate the ignition timing (S100) When a knock control system (KCS) executes known knocking control or the like, the CPU 72 determines that the ignition timing is a value that is obtained by retarding the reference ignition timing by the retardation amount aop and then feedback-corrected by the KCS. The reference ignition timing is variably set by the CPU 72 in accordance with the rotation speed NE of the crankshaft 28 and the charging efficiency η. The charging efficiency η is calculated by the CPU 72 based on the rotation speed NE and the intake air amount Ga.

The CPU 72 executes a process that updates the relationship specifying data DR (S22a) and temporarily ends the series of the processes shown in FIG. 6.

Figure 7:
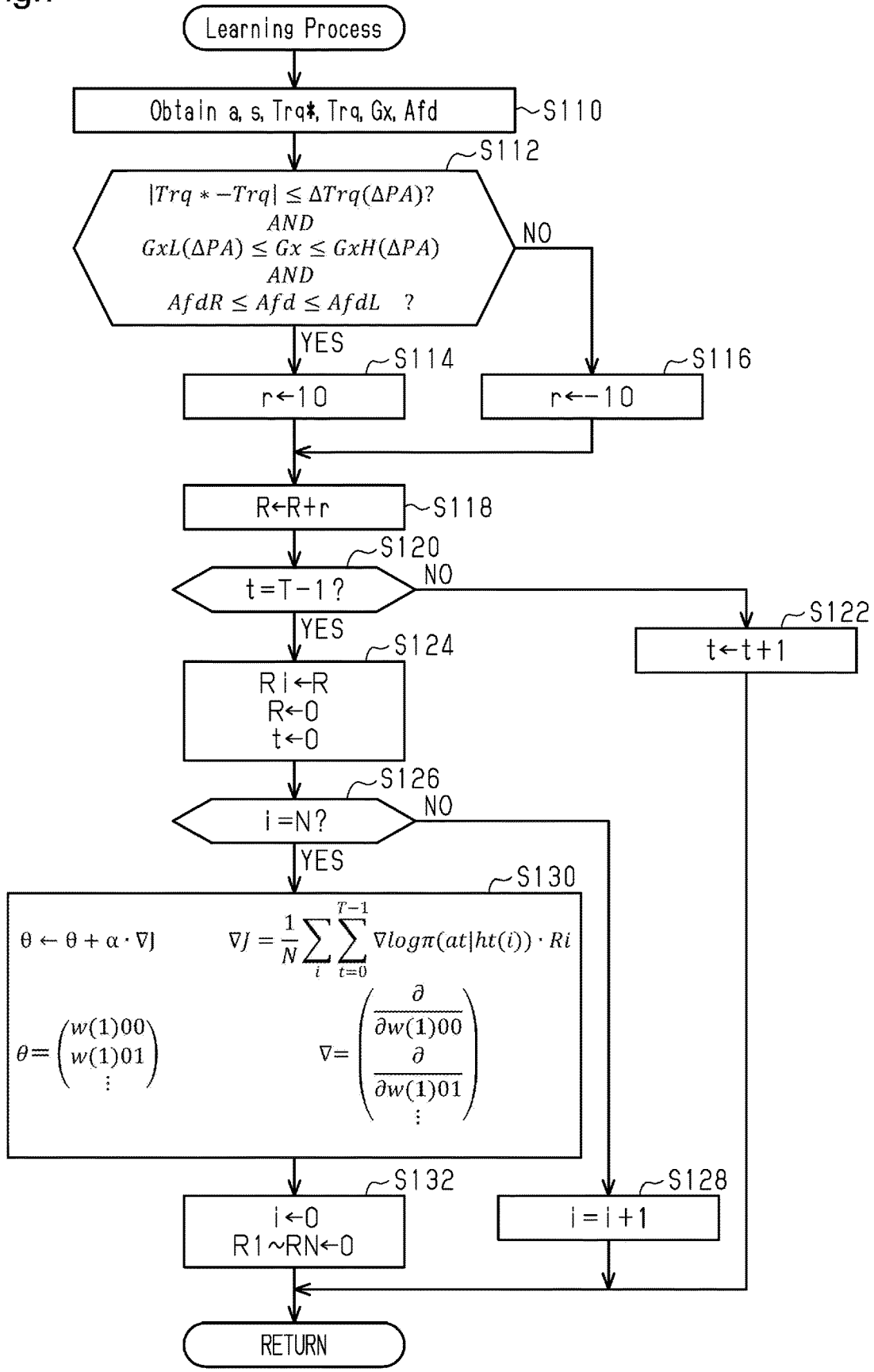
FIG. 7 is a flowchart showing the detailed procedures of a learning process in the third embodiment.

FIG. 7 shows details of the process of S22a.

The CPU 72 obtains a torque instruction value Trq*, the torque Trq, the acceleration rate Gx, and the downstream detection value Afd in addition to the action a and the states (S110). The CPU 72 calculates the torque Trq by inputting the rotation speed NE, the charging efficiency 11, and the ignition timing to a torque output mapping. The CPU 72 sets the torque instruction value Trq* in accordance with the accelerator operation amount PA.

The CPU 72 determines whether the logical conjunction of the following conditions (F) to (H) is true (S112).

Condition (F) is that the absolute value of the difference between the torque Trq and the torque instruction value Trq* is less than or equal to a specified amount ΔTrq.

Condition (G) is that the acceleration rate Gx is greater than or equal to a lower limit value GxL and less than or equal to an upper limit value GxH.

Condition (H) is that the downstream detection value Afd is greater than or equal to a rich threshold value AfR and less than or equal to a lean threshold value AfL.

If it is determined that the logical conjunction is true (S112: YES), the CPU 72 assigns "10" to the reward r (S114). If it is determined that the logical conjunction is false (S112: NO), the CPU 72 assigns "−10" to the reward r (S116). When the process of S114 or S116 is completed, the CPU 72 adds the reward r to the return R (S118). The processes of S112 to S114 and S116 assign a greater reward when the drivability meets a criterion than when the drivability does not meet the criterion and assign a greater reward when an emission property meets a criterion than when the emission property does not meet the criterion.

The CPU 72 determines whether a variable t has reached a predetermined time T−1 (S120). If it is determined that the variable t has not reached the predetermined time T−1 (S120: NO), the CPU 72 increments the variable t (S122).

If it is determined that the variable t has reached the predetermined time T−1 (S120: YES), the CPU 72 assigns the return R to return Ri and then initializes the return R and the variable t (S124). The CPU 72 determines whether a variable i has reached a predetermined value N (S126). If it is determined that the variable i has not reached the predetermined value N (S126: NO), the CPU 72 increments the variable i (S128).

If it is determined that the variable i has reached the predetermined value N (S126: YES), the CPU 72 updates a coefficient wT and variables w(1) to w(p) that specify the policy π using the policy gradient method (S130). In FIG. 7, the coefficient wT and the variables w(1) to w(p) specifying the policy π are collectively referred to as a parameter θ.

With each variable t changing from 0 to T−1, a set of the state s, the action a, and the reward r is referred to as a trajectory ht, and a probability that the trajectory ht is obtained in accordance with the policy π specified by the parameter θ is referred to as a probability pθ(ht). The number of sets is T. The integral value of "pθ(ht)·Rt" with the trajectory ht is an expected value (expected return J) of the return R(ht). The parameter θ is updated to maximize the expected value. This is achieved when an update amount of each component in the parameter θ is proportional to a value obtained by partially differentiating the expected return J with the component.

The probability pθ(ht) will be expressed as follows using states s0, s1, . . . sT, and actions a0, a1, . . . aT.

$$p\theta(ht)=p(s0)\cdot p(s1|s0,a0)\cdot \pi(a0|s0)\cdot p(s2|s1,a1) \ldots p(sT|sT-1,aT-1)\cdot \pi(aT-1|sT-1)$$

The initial probability p(s0) is a probability that the state s0 is obtained. A transition probability p(st+1|stat) is a probability of transitioning from the state st to the state st+1 with the state st and the action at.

Thus, the partial differential of the expected return J is expressed with the following equation (c1).

$$\nabla J = \nabla \int p\theta(ht) \cdot R(ht) dht = \int R(ht) p\theta(ht) \nabla \log p\theta(ht) dht = \int R(ht) p\theta(ht) \sum_{t=0}^{T-1} \nabla \log \pi(at|st) dht \quad (c1)$$

Since the probability pθ(ht) is unknown, the integral of equation (c1) is replaced with an average value of trajectories ht (here, the number of trajectories ht is the predetermined value N).

Thus, the partial differential of each component in the parameter θ of the expected return J is a value obtained as follows. The product of the return Ri and a sum of partial differential coefficients, with respect to the corresponding component of the parameter θ, of a logarithm of the policy π(at|st) with "t=0 to T−1" is summed for the returns Ri, the number of which is the predetermined value N. Then, the summed value is divided by the predetermined value N.

The CPU 72 obtains a value by multiplying the partial differential coefficient of the expected return J with respect to each component of the parameter θ by a learning ratio α and uses the obtained value as an update amount of the corresponding component of the parameter θ.

The processes of S118 to S130 are implemented by executing an instruction to execute an update mapping that inputs the states s0, s1, . . . , the actions a0, a1, . . . , and the reward r in the learning program 74b stored in the ROM 74 to output an updated parameter θ.

When the process of S130 is completed, the CPU 72 initializes the variable i and the return R1 to RN (S132).

When the process of S122, S128, or S132 is completed, the CPU 72 temporarily ends the series of the processes shown in FIG. 7.

Figure 8:
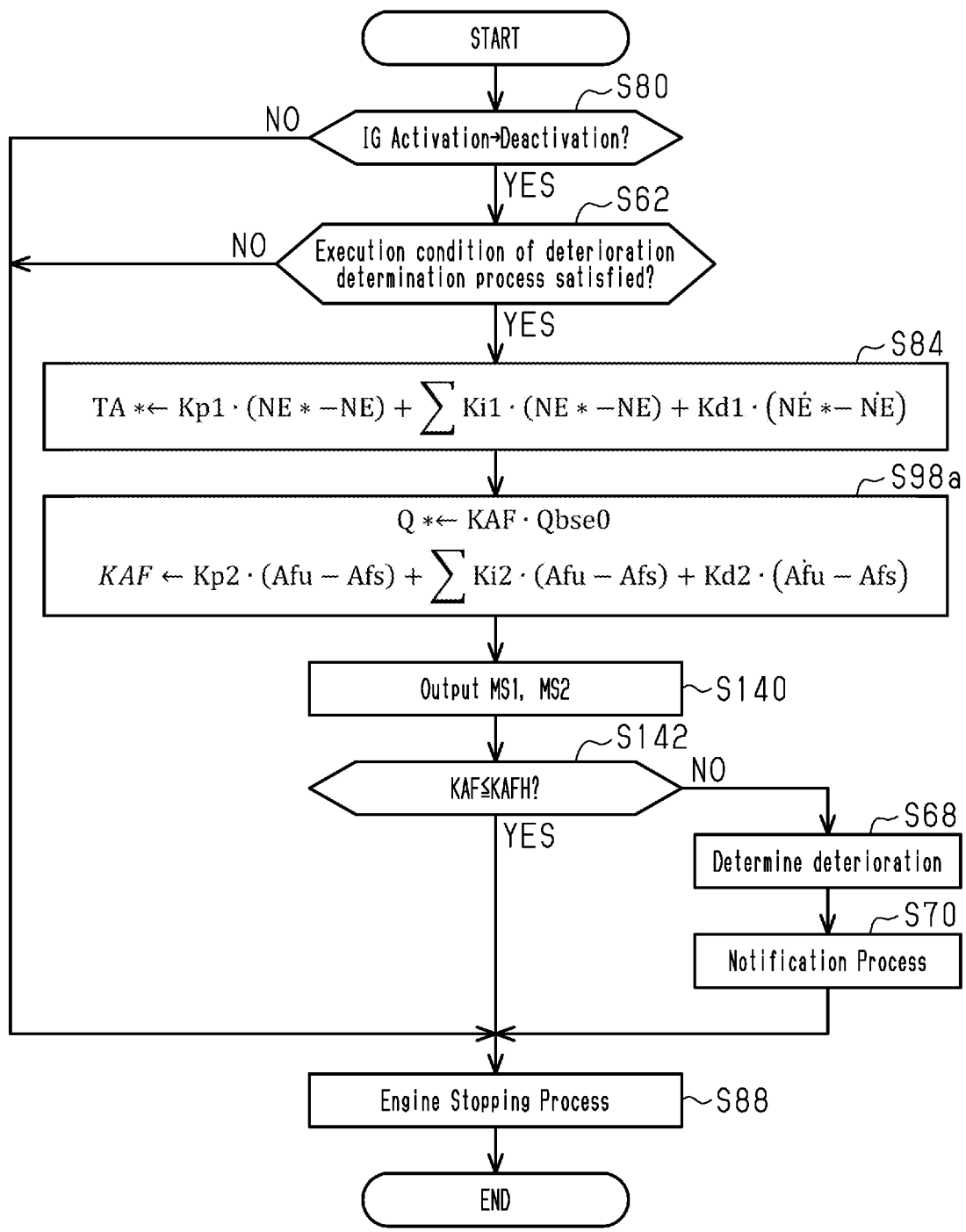
FIG. 8 is a flowchart showing the procedures of a deterioration determination process in the third embodiment.

FIG. 8 shows the procedures of a process related to determination of whether the fuel injection valve 16 has deteriorated in the present embodiment. The process shown in FIG. 8 is implemented by the CPU 72, for example, repeatedly executing the deterioration determination program 74c stored in the ROM 74 in a predetermined cycle. For the sake of convenience, in FIG. 8, the same step numbers are given to the processes corresponding to those in FIG. 5.

In a series of the processes shown in FIG. 8, if it is determined that the execution condition of the deterioration determination process is satisfied (S62:YES), the CPU 72 executes the process of S84. The CPU 72 calculates the injection amount instruction value Q* by correcting the base injection amount Qbse0 using the feedback correction coefficient KAF, which is an operation amount used to feedback-control the upstream detection valve Afu to a reference value Afs (S98a). The base injection amount Qbse0 is a value proportional to the charging efficiency η and irrelevant to the relationship specifying data DR. The base injection amount Qbse0 is an operation amount used to open-loop-control the upstream detection valve Afu to the reference value Afs.

The CPU 72 outputs the operating signal MS1 to operate the throttle valve 14 so that the throttle opening degree TA is feedback-controlled to the throttle opening degree instruction value TA*, and outputs the operating signal MS2 to operate the fuel injection valve 16 so that the amount of fuel injected from the fuel injection valve 16 equals an amount corresponding to the injection amount instruction value Q* (S140).

On condition that each of the rotation speed NE and the feedback correction coefficient KAF converges, the CPU 72 determines whether the feedback correction coefficient KAF is less than or equal to an upper limit value KAFH (S142). This process determines whether the fuel injection valve 16 has deteriorated. More specifically, when objects collect in an injection hole of the fuel injection valve 16 and decrease the cross-sectional area of the passage in the injection hole, deterioration occurs. This increases an amount of increase correction in the injection amount by the feedback correction coefficient KAF.

If it is determined that the feedback correction coefficient KAF is greater than the upper limit value KAFH (S142:NO), the CPU 72 executes the process of S68 and S70.

When the process of S70 is completed, when an affirmative determination is made in S142, or when a negative determination is made in S80 or S62, the CPU 72 stops the internal combustion engine 10 (S88) and temporarily ends the series of the processes shown in FIG. 8.

The operation and advantages of the present embodiment will now be described.

The CPU 72 obtains time series data of the accelerator operation amount PA, the rotation speed NE, the charging efficiency and the downstream detection value Afd and sets an action a including the throttle opening degree instruction value TA*, the retardation amount aop, the base injection amount Qbse, and the target value Afu* in accordance with the policy π. The base injection amount Qbse may not equal a value obtained by multiplying the charging efficiency η by a proportional coefficient determined by the target value Afu*. However, this allows for reinforcement learning to find an appropriate value of the base injection amount Qbse, which is an operation amount used to reach the target value Afu* in open-loop control, for example, during a transition period in which the accelerator operation amount PA changes greatly. In addition, the target value Afu* may not be set to a value between a rich-side upper limit value AfdR and a lean-side upper limit value AfdL. However, this allows for reinforcement learning to find an appropriate target value Afu* for controlling the downstream detection value Afd to a value between the rich-side upper limit value AfdR and the lean-side upper limit value AfdL.

As described above, in the present embodiment, the base injection amount Qbse and the target value Afu* are further used as action variables to find appropriate control for targeting the exhaust component at the downstream side of the catalyst 34 through exploration.

However, in this case, how the deterioration of the fuel injection valve 16 affects the feedback correction coefficient KAF is unclear. In this regard, in the present embodiment, when the IG signal is in the deactivation state, the idling rotation speed control is executed so that the feedback correction coefficient KAF is used as a feedback correction amount of the base injection amount Qbse0. The feedback correction coefficient KAF compensates for an error of the base injection amount Qbse0 when controlling the upstream detection valve Afu to the reference value Afs. This clarifies the relationship between the feedback correction coefficient KAF and the deterioration level of the fuel injection valve 16. Thus, whether the fuel injection valve 16 has deteriorated is determined with high accuracy.

The present embodiment further has the following operation and advantages.

(2) Use of the function approximator for the relationship specifying data DR facilitates the handling of the relationship specifying data DR even when states and actions are continuous variables.

(3) The independent variables of the action value function Q include time series data of the accelerator operation amount PA. Thus, the value of the action a is finely adjusted in accordance with various changes in the accelerator operation amount PA as compared to a configuration in which only a single sampling value related to the accelerator operation amount PA is used as the independent variable.

(4) The independent variables of the action value function Q include the throttle opening degree instruction value TA*. This increases the degree of freedom for exploration by reinforcement learning as compared to, for example, a configuration in which a model-type parameter that models behavior of the throttle opening degree instruction value TA* is used as an independent variable related to the throttle opening degree.

Fourth Embodiment

A fourth embodiment will now be described with reference to the drawings. The differences from the third embodiment will mainly be discussed.

In the present embodiment, the relationship specifying data DR is updated outside the vehicle VC1.

Figure 9:
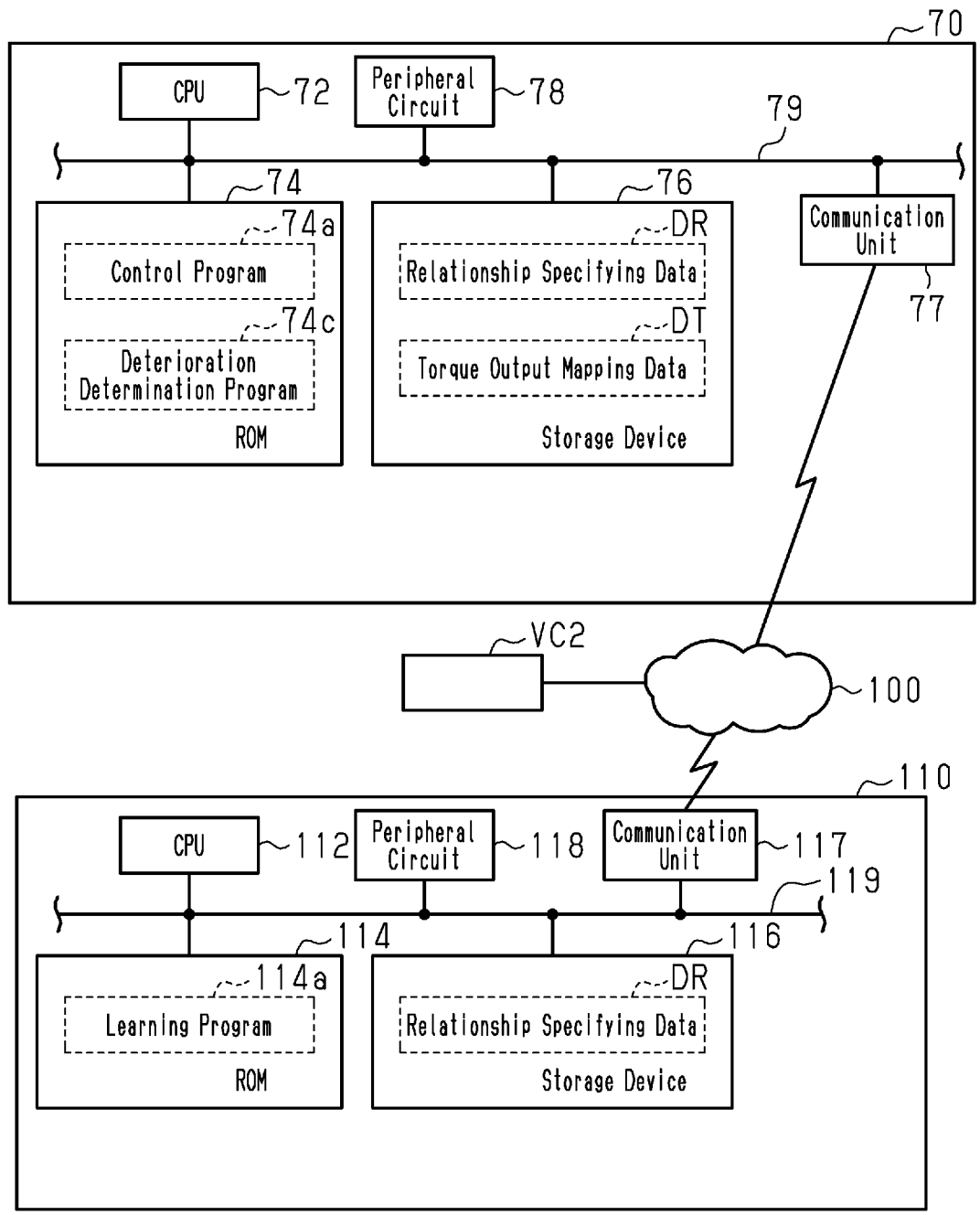
FIG. 9 is a diagram showing the configurations of a control system in a fourth embodiment.

FIG. 9 shows the configurations of a control system that executes reinforcement learning in the present embodiment. For the sake of convenience, in FIG. 9, the same reference numerals are given to the components that are the same as those in FIG. 1.

As shown in FIG. 9, the ROM 74 of the controller 70 arranged in the vehicle VC1 stores the control program 74a and does not store the learning program 74b. The controller 70 includes a communication unit 77. The communication unit 77 is configured to communicate with a data analysis center 110 through an external network 100 of the vehicle VC1.

The data analysis center 110 analyzes data transmitted from vehicles VC1, VC2, . . . . The data analysis center 110 includes a CPU 112, a ROM 114, an electrically rewritable nonvolatile memory (storage device 116), a peripheral circuit 118, and a communication unit 117, which are configured to communicate with each other through a local network 119. The ROM 114 stores a learning program 114a. The storage device 116 stores the relationship specifying data DR.

Figure 10:
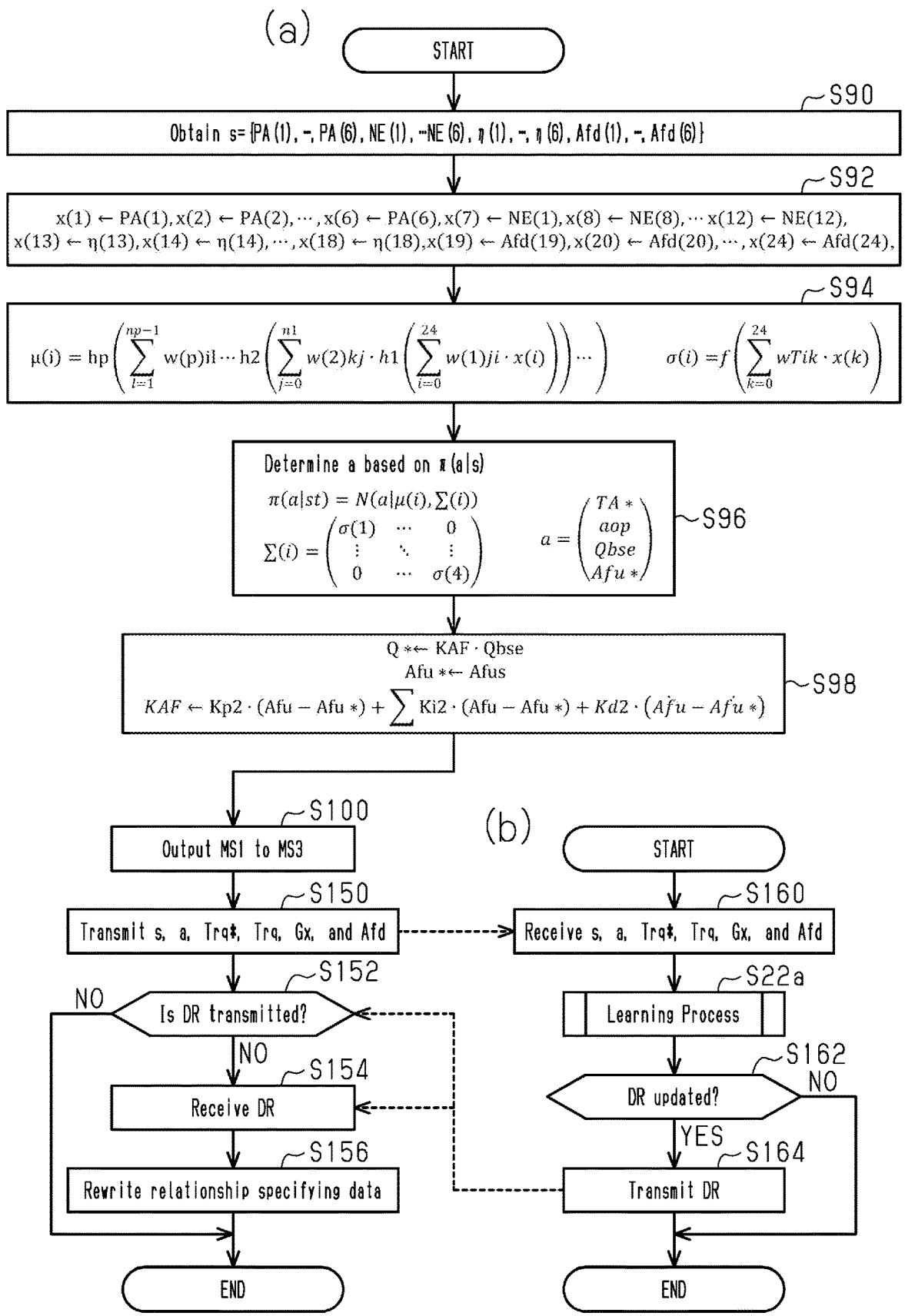
FIG. 10 is a flowchart showing the procedures of a process executed by the control system in the fourth embodiment.

FIG. 10 shows the procedures of a reinforcement learning process in the present embodiment. The process shown in (a) of FIG. 10 is implemented by the CPU 72 executing the control program 74a stored in the ROM 74 shown in FIG. 9. The process shown in (b) of 10 is implemented by the CPU 112 executing the learning program 114a stored in the ROM 114. For the sake of convenience, in FIG. 10, the same step numbers are given to the processes that correspond to those in FIG. 6. The process shown in FIG. 10 will be described below along a temporal sequence of reinforcement learning.

As shown in (a) of FIG. 10, the CPU 72 executes the processes of S90 to S100 and operates the communication unit 77 to transmit data used in the updating process of the relationship specifying data DR (S150). Data that is subject to transmission includes the state s set in the process of S90, the action a set in the process of S96, the torque instruction value Trq*, the torque Trq, the acceleration rate Gx, and the downstream detection value Afd.

As shown in (b) of FIG. 10, the CPU 112 receives the transmitted data (S160) and updates the relationship specifying data DR based on the received data (S22a). The CPU 112 determines whether there is relationship specifying data DR that was updated and should be transmitted (S162). If there is the relationship specifying data DR (S162: YES), the CPU 112 operates the communication unit 117 to transmit the relationship specifying data DR to the vehicle VC1 from which data was received in S160 (S164). The relationship specifying data DR that was updated and should be transmitted may be data updated a predetermined number of times or more. When the process of S164 is completed or a negative determination is made in S162, the CPU 112 temporarily ends the series of the processes shown in (b) of FIG. 10.

As shown in FIG. (a) of FIG. 10, the CPU 72 determines whether there is updated data (S152). If there is updated data (S152: YES), the CPU 72 receives the updated relationship specifying data DR (S154). The CPU 72 rewrites the relationship specifying data DR that is used in S96 with the received relationship specifying data DR (S156). When the process of S156 is completed or a negative determination is made in S152, the CPU 72 temporarily ends the series of the processes shown in (a) of FIG. 10.

In the present embodiment, the updating process of the relationship specifying data DR is executed outside the vehicle VC1. This reduces calculation loads on the controller 70. In addition, for example, when data is received from multiple vehicles VC1 and VC2 in S90, and S22a is executed, the number of pieces of data used in learning may be readily increased.

Correspondence Relationship

Correspondence relationship between the items in the embodiments described above and the items described in "Summary" is as follows. Hereinafter, the correspondence relationship is shown with each number of the aspects described in "Summary."

[1] The execution device, that is, the processing circuitry, corresponds to the CPU 72 and the ROM 74. The storage device corresponds to the storage device 76. The obtaining process corresponds to the processes of S12, S18, S90, and S110. The operating process corresponds to the processes of S16 and S100. The reward calculation process corresponds to the processes of S34 to S42 shown in FIG. 3 and the processes of S112 to S116 shown in FIG. 7. The updating process corresponds to the processes of S44 to S50 shown in FIG. 3 and the processes of S118 to S130 shown in FIG. 7. The update mapping corresponds to a mapping specified by an instruction to execute the processes of S44 to S50 and a mapping specified by an instruction to execute the processes of S118 to S130 in the learning program 74b. The determination process corresponds to the processes of S66 and S68 and the processes of S142 and S68.

[2] The active process corresponds to the process of S86 and the process of S140.

[3] The determination process corresponds to the processes shown in FIGS. 5 and 8.

[4] The EGR regulator corresponds to the intake valve timing variable device 44.

[5] The air-fuel ratio variable corresponds to the target value Afu*.

[6 to 8] The first execution device corresponds to the CPU 72 and the ROM 74. The second execution device corresponds to the CPU 112 and the ROM 114.

Other Embodiments

The embodiments may be modified as follows. The embodiments and the following modified examples can be combined as long as the combined modified examples remain technically consistent with each other.

Action Variable

In the process shown in FIG. 2, the intake phase difference DIN is used as a variable that regulates an EGR amount. However, there is no limitation to such a configuration. For example, as described in "EGR Amount Regulator," when the internal combustion engine 10 includes an exhaust valve timing variable device, a variable that expresses a valve property of the exhaust valve 30 may be used as the variable that regulates the EGR amount. In addition, for example, as described in "EGR Amount Regulator," when the internal combustion engine 10 includes an EGR passage through which the exhaust is discharged from the exhaust passage 32 to the intake passage 12, a variable may be related to operation of a regulator that regulates the flow rate of the exhaust discharged to the intake passage 12 through the EGR passage.

In the process shown in FIG. 2, the action variable is a combination of a variable related to the opening degree of the throttle valve and the EGR variable, that is, a variable related to operation of the EGR amount regulator such as the intake valve timing variable device 44. However, there is no limitation to such a configuration. For example, a variable related to the ignition timing may be included in addition to the variable related to the opening degree of the throttle valve and the EGR variable.

In the process shown in FIG. 6, the throttle opening degree instruction value TA* is used as the action variable related to the opening degree of the throttle valve. However, there is no limitation to such a configuration. For example, the responsiveness of the throttle opening degree instruction value TA* to the accelerator operation amount PA may be expressed in a waste time and a secondary delay filter. Two variables specifying the waste time and the secondary delay filter may be added, and the three variables may be used as the variables related to the opening degree of the throttle valve. In this case, the state variable may be an amount of change in the accelerator operation amount PA per unit time instead of the time series data of the accelerator operation amount PA.

In the process shown in FIG. 6, the retardation amount aop is used as the action variable related to ignition timing. However, there is no limitation to such a configuration. For example, the ignition timing that is subject to correction by the KCS may be used.

In the process shown in FIG. 6, the base injection amount Qbse is used as the variable related to the injection amount. However, there is no limitation to such a configuration. For example, when air-fuel ratio feedback control is not executed, the action variable may include the injection amount instruction value Q*. In this case, the injection amount instruction value Q*, which is a variable that determines the air-fuel ratio of the mixture in the combustion chamber 24, is also used as the air-fuel ratio variable.

In the process shown in FIG. 6, the action variable is a combination of the variable related to the opening degree of the throttle valve, the variable related to the ignition timing, the variable related to the fuel injection amount, and the variable related to the air-fuel ratio control. However, there is no limitation to such a configuration. For example, among the four variables, only three may be used, only two may be used, or only one may be used.

As described in the section "Internal Combustion Engine," when the internal combustion engine is of a compression ignition type, a variable related to an injection amount may be used instead of the variable related to the opening degree of the throttle valve, and a variable related to injection timing may be used instead of the variable related to ignition timing. It is desirable that a variable related to the number of injections performed in one combustion cycle and a variable related to a time interval between the end time and the start time of two fuel injections for one cylinder that are adjacent on a time-series basis in one combustion cycle be included in addition to the variable related to injection timing.

State

In the processes shown in FIGS. 6 and 10, the time series data of the accelerator operation amount PA has six values that are sampled at equal intervals. However, there is no limitation to such a configuration. The data may have two or more sampling values that are obtained at different sampling timings. In this case, the data may have three or more sampling values and may be sampled at equal intervals.

The state variable related to the accelerator operation amount is not limited to the time series data of the accelerator operation amount PA and may be, for example, an amount of change in the accelerator operation amount PA per unit time as described in the section of "Action Variable."

In the processes shown in FIGS. 6 and 10, the time series data of the rotation speed NE has six values that are sampled at equal intervals. However, there is no limitation to such a configuration. The data may have two or more sampling values that are obtained at different sampling timings. In this case, the data may have three or more sampling values and may be sampled at equal intervals.

In the processes shown in FIGS. 6 and 10, the time series data of the charging efficiency η has six values that are sampled at equal intervals. However, there is no limitation to such a configuration. The data may have two or more sampling values that are obtained at different sampling timings. In this case, the data may have three or more sampling values and may be sampled at equal intervals.

In the processes shown in FIGS. 6 and 10, the time series data of the downstream detection value Afd has six values that are sampled at equal intervals. However, there is no limitation to such a configuration. The data may have two or more sampling values that are obtained at different sampling timings. In this case, the data may have three or more sampling values and may be sampled at equal intervals.

In the processes shown in FIGS. 6 and 10, it is not necessary to use four types of time series data of the accelerator operation amount PA, the rotation speed NE, the charging efficiency η, and the downstream detection value Afd. Among the four types of data, only three may be used, only two may be used, or only one may be used. When time series data of multiple variables is used, the variables do not necessarily have to have the same number of samplings of time series.

Relationship Specifying Data

In the embodiments, the action value function Q is of a table-type. However, there is not limitation to such a configuration. For example, a function approximator may be used.

Operating Process

For example, as described in the section of "Relationship Specifying Data," when the action value function is a function approximator, the action a that maximizes the action value function Q may be specified by inputting the state s and all combinations of discrete values of the action used as an independent variable of the table-type function in the embodiments into the action value function Q. More specifically, for example, while using mainly the specified action a for operation, other actions may be selected at a predetermined probability.

Update Mapping

In the processes of S44 to S50, an e-soft on-policy Monte Carlo method is used. However, there is no limitation to such a configuration. For example, an off-policy Monte Carlo method may be used. Moreover, there is no limitation to a Monte Carlo method. For example, an off-policy temporal difference (TD) method may be used. An on-policy TD method such as a state-action-reward-state-action (SARSA) method may be used. An eligibility trace method may be used as on-policy learning.

The subject that is directly updated by the reward r is not limited to only one of the action value function Q and the policy π. For example, as an actor-critic method, each of the action value function Q and the policy π may be updated. Further, in the actor-critic method, for example, a value function V may be updated instead of the action value function Q.

Reward Calculation Process

In the process shown in FIG. 3, the assigned reward differs between when conditions (A) and (B) are satisfied, when condition (A) is satisfied and conditions (B) and (C) are not satisfied, and when condition (A) is not satisfied or condition (C) is satisfied. However, there is no limitation to such a configuration. For example, the process of one of S38 or S42 may be executed in accordance with whether a logical conjunction of condition (A) being satisfied and condition (C) being unsatisfied is true.

The process that assigns a greater reward when the energy usage efficiency is greater than or equal to an efficiency lower limit value than when the energy usage efficiency is less than the efficiency lower limit value is not limited to a process that assigns a reward in accordance with whether condition (C) described above is satisfied. For example, the process may assign a greater reward when the fuel consumption amount of the vehicle VC1 traveling on a predetermined road is less than or equal to a consumption upper limit value than when the fuel consumption amount is greater than the consumption upper limit value.

The reward calculation process is not limited to one of the process that assigns a greater reward r when the energy usage efficiency meets the criterion than when the energy usage efficiency does not meet the criterion, the process that assigns a greater reward when the drivability meets the criterion than when the drivability does not meet the criterion, and the process that assigns a greater reward when the emission property meets the criterion than when the emission property does not meet the criterion. One, two, or three among the process that assigns a greater reward when the energy usage efficiency meets the criterion than when the energy usage efficiency does not meet the criterion, the process that assigns a greater reward when the drivability meets the criterion than when the drivability does not meet the criterion, and the process that assigns a greater reward when the emission property meets the criterion than when the emission property does not meet the criterion may be included.

In the process of FIG. 7, the reward is assigned based on whether the logical conjunction of conditions (F) to (H) is true. However, there is no limitation to such a configuration. For example, a process that assigns a reward based on whether condition (F) is satisfied, a process that assigns a reward based on whether condition (G) is satisfied, and a process that assigns a reward based on whether condition (H) is satisfied may be executed. Furthermore, for example, among the process that assigns a reward based on whether condition (F) is satisfied, the process that assigns a reward based on whether condition (G) is satisfied, and the process that assigns a reward based on whether condition (H) is satisfied, only one may be executed, or only two may be executed.

EGR Regulator

In the embodiments, the EGR amount regulator is the intake valve timing variable device 44. However, there is no limitation to such a configuration. For example, the EGR amount regulator may be the exhaust valve timing variable device, which varies the valve property of the exhaust valve 30. For example, when the internal combustion engine 10 includes an EGR passage through which the exhaust is discharged from the exhaust passage 32 to the intake passage 12, and the EGR amount regulator may be a regulator such as a valve or a pump that regulates the flow rate of the exhaust discharged to the intake passage 12 through the EGR passage.

Vehicle Control System

In the example shown in FIG. 10, the entire process of S22a is executed by the data analysis center 110. However, there is not limitation to such a configuration. For example, the data analysis center 110 may be configured to execute the processes of S118 to S130 and not to execute the processes of S112 to S116, which correspond to the reward calculation process. In S150, the result of the processes of S114 and S116 may be transmitted.

The vehicle control system is not limited to one configured by the controller 70 and the data analysis center 110. For example, instead of the data analysis center 110, a mobile terminal carried by a user may be used so that the vehicle control system is configured by the controller 70 and the mobile terminal. Alternatively, for example, the vehicle control system may be configured by the controller 70, the mobile terminal, and the data analysis center 110. This may be implemented by, for example, the mobile terminal executing the process S96 shown in FIG. 10.

Execution Device

The execution device is not limited to a device that includes the CPU 72 (112) and the ROM 74 (114) and executes the software processes. For example, a dedicated hardware circuit (e.g., AS1C, etc.) configured to process at least some of the software processes executed in the embodiments may be provided. More specifically, the execution device may have any one of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with programs and a dedicated hardware circuit that executes the remaining processes. Configuration (c) includes a dedicated hardware circuit that executes all of the above-described processes. Multiple software execution devices each including a processor and a program storage device and multiple dedicated hardware circuits may be provided. More specifically, the above-described processes may be executed by processing circuitry that includes at least one of one or more software execution devices or one or more dedicated hardware circuits. The program storage device, that is, a computer readable medium, includes any medium that can be accessed from a general-purpose computer or a dedicated computer.

Storage Device

In the embodiments, the storage device that stores the relationship specifying data DR is different from the storage device (ROM 74) that stores the learning program 74b and the control program 74a.

Internal Combustion Engine

The internal combustion engine is not limited to one including a port injection valve that injects fuel into the intake passage 12 as a fuel injection valve and may be, for example, one including a direct injection valve that directly injects fuel into the combustion chamber 24 or one including both a port injection valve and a direct injection valve.

The internal combustion engine is not limited to a spark ignition type internal combustion engine and may be, for example, a compression ignition type internal combustion engine that uses, for example, light oil as fuel.

Vehicle

The vehicle is not limited to a vehicle in which an internal combustion engine is only a thrust force generator. The vehicle may be, for example, a hybrid vehicle including an internal combustion engine and a rotary electric machine. Alternatively, the vehicle may be, for example, an electric car or a fuel cell vehicle that does not include an internal combustion engine and includes a rotary electric device as a thrust force generator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller, comprising:
   processing circuitry; and
   a storage device, wherein
   the storage device stores relationship specifying data that specifies a relationship between a state of a vehicle and at least one action variable,
   the at least one action variable is a variable related to operation of an operating unit of an internal combustion engine mounted on the vehicle,
   the processing circuitry is configured to execute
      an obtaining process that obtains a state of the vehicle based on a detection value of a sensor,
      an operating process that operates the operating unit based on a value of the at least one action variable determined by the state of the vehicle obtained by the obtaining process and the relationship specifying data,
      a reward calculation process that assigns a reward based on the state of the vehicle obtained by the obtaining process, the reward assigned when a property of the vehicle meets a criterion is greater than the reward assigned when the property of the vehicle does not meet the criterion,
      an updating process that updates the relationship specifying data using the state of the vehicle obtained by the obtaining process, the value of the at least one action variable used for operation of the operating unit, and the reward corresponding to the operation as inputs to a predetermined update mapping, and
      a determination process that determines whether the internal combustion engine has deteriorated, the determination process being executed on condition that at least one of the at least one action variable equals a predetermined value, and
   the update mapping outputs the relationship specifying data that is updated to increase an expected return of the reward when the operating unit is operated in accordance with the relationship specifying data.

2. The vehicle controller according to claim 1, wherein the processing circuitry is configured to stop the operating process, execute an active process that operates the operating unit so that at least one of the at least one action variable equals the predetermined value, and execute the determination process during execution of the active process.

3. The vehicle controller according to claim 1, wherein the processing circuitry is configured to execute the determination process on condition that the vehicle is at a standstill.

4. The vehicle controller according to claim 1, wherein
   the internal combustion engine includes, as the operating unit, a throttle valve and an exhaust gas recirculation (EGR) regulator that is configured to regulate an EGR amount,
   the operating process includes a process that operates the throttle valve and the EGR regulator so that a rotation speed of a crankshaft of the internal combustion engine is controlled to a target rotation speed,
   the at least one action variable includes a variable related to an opening degree of the throttle valve and an EGR variable, which is a variable used to operate the EGR regulator, and
   the determination process includes a process that determines whether an intake system of the internal combustion engine has deteriorated based on the opening degree of the throttle valve on condition that the EGR regulator is in a predetermined state.

5. The vehicle controller according to claim 1, wherein
   the internal combustion engine includes a fuel injection valve as the operating unit,
   the at least one action variable includes an air-fuel ratio variable, which is a variable that determines an air-fuel ratio of a mixture in a combustion chamber of the internal combustion engine, and
   the determination process includes a process that determines whether the fuel injection valve has deteriorated based on an open time of the fuel injection valve on condition that the air-fuel ratio variable equals a predetermined value.

6. A vehicle control system, comprising:
   the processing circuitry and the storage device according to claim 1, wherein
   the processing circuitry includes a first execution device mounted on the vehicle and a second execution device that is different from an on-board device,
   the first execution device is configured to execute at least the obtaining process and the operating process, and
   the second execution device is configured to execute at least the updating process.

7. A vehicle controller, comprising:
   the first execution device according to claim 6.

8. A learning device for a vehicle, the learning device, comprising:
   the second execution device according to claim 6.

* * * * *